United States Patent [19]

Swords et al.

[11] Patent Number: 5,407,015
[45] Date of Patent: Apr. 18, 1995

[54] BOTTOM PLOW AND A SOIL BREAKING APPARATUS

[76] Inventors: Clyde C. Swords; James R. Swords, both of Rte. 2, Box 50, Arlington, Ga. 31713

[21] Appl. No.: 12,143

[22] Filed: Jan. 29, 1993

[51] Int. Cl.⁶ .......................... A01B 49/02; A01B 3/28
[52] U.S. Cl. ...................... 172/200; 172/203; 172/161; 172/776; 172/219
[58] Field of Search ............. 172/161, 162, 193–195, 172/197–203, 137, 690, 694, 776, 219

[56] References Cited

U.S. PATENT DOCUMENTS

| | | | |
|---|---|---|---|
| 426,704 | 4/1890 | Beck | 172/689 |
| 467,020 | 1/1892 | Rhoads | 172/203 |
| 489,213 | 1/1893 | Berlin | 172/203 |
| 1,162,068 | 11/1915 | Johnson | 172/689 |
| 2,672,801 | 3/1954 | Barrett, Jr. | 172/162 |
| 3,100,018 | 8/1963 | Sokolowski | 172/198 |
| 3,490,544 | 1/1970 | Godbersen | 172/202 |
| 3,559,745 | 2/1971 | Thompson et al. | |
| 4,207,951 | 6/1980 | Wilcox et al. | |
| 4,942,928 | 7/1990 | Gomez | |
| 5,000,267 | 3/1991 | Harrell | 172/219 |
| 5,172,769 | 12/1992 | Lunsford, Jr. | 172/162 |

FOREIGN PATENT DOCUMENTS 555113 4/1931 Germany .......................... 172/689

OTHER PUBLICATIONS

Imperial, "Mulches".

*Primary Examiner*—Randolph A. Reese
*Assistant Examiner*—Spencer Warnick
*Attorney, Agent, or Firm*—Baker & Botts

[57] ABSTRACT

A soil breaking apparatus for use with a bottom plow comprises a beam pivotally attached by a bolt to the bottom plow; a port arm and a starboard arm fixedly attached to the beam; and a two-way hydraulic cylinder for pivoting the arms and the beams, such that the arms are oriented substantially parallel to the soil despite the tilting of the bottom plow. The soil breaking apparatus is suitable for use with bottom plows, such as bidirectional moldboard plows. The clumps or clods of soil turned up during plowing are broken up by soil breaking rods that depend from and are spaced along the arms. An improved plow combines the features of the soil breaking apparatus with those of a reversible bottom plow.

32 Claims, 5 Drawing Sheets

BOTTOM PLOW AND A SOIL BREAKING APPARATUS

BACKGROUND OF THE INVENTION

1. Field of the Invention

This invention relates to an apparatus for breaking up soil turned by a bottom plow. In particular, the invention relates to an apparatus for breaking up adhesive soils, such as those having a high clay content, turned by a bottom plow, such as a bidirectional moldboard plow with an adjustable tilting mechanism. The invention also relates to a combination of a reversible bottom plow and an apparatus for turning and breaking up such adhesive soils.

2. Description of Related Art

A plow is essentially a wedge that is dragged through the soil by a draft animal or a farm vehicle, such as a tractor. The plow cuts away the top layer of the soil and turns over that layer. In this manner, it is possible to incorporate harvest remains, expose pests and weeds to the weather, and to prepare the soil for planting and to retain water.

In order to turn and break up soil, moldboard and rotary disc plows are already known and used. Disc plows are made up of a series of rotary concave discs mounted individually and supported by a frame. Their soil penetrating ability is primarily due to their weight although it is also affected by the vertical and horizontal positions of the discs. Because the discs are rotary, they allow bidirectional operation solely by reversing the direction of their disc faces. Nevertheless, disc plows are limited by the cutting width of their discs.

A conventional moldboard plow comprises a share, a unidirectional moldboard, and a landside. The share is a blade-like portion of the plow which makes a substantially horizontal cut into the soil and frees the top layer of the soil. The moldboard is attached to the share and lifts and turns this layer of soil. Moldboard plows also require a landside, e.g., a protective heel or wear plate or similar structure, to compensate for the lateral force on the moldboard and to control depth. The landside is fixed to the side of the moldboard and slides along the vertical wall of the furrow. It thrusts the moldboard on to turn the layer of soil.

Moldboard plows cause a layer of soil to be cut and rolled e.g., turned, by the curved, tilted arrangement of the moldboard. There are various designs of moldboard for different speeds of plowing, width of cut, and types of soil. The bodies of moldboard plows also occasionally require a disconnecting device for uneven ground or ground with stumps, rocks, hard strips, or other obstructions.

Plows with multiple moldboards are common. Such plows commonly comprise moldboards that are then fastened to supports. A plurality of these supports are fastened to a moldboard frame. Because they do not leave the soil without cutting and turning it and are not limited by their cutting width, moldboard plows are generally preferred over disc plows.

Nevertheless, moldboard plows usually have a single set of moldboards that can only turn the soil in one direction. For example, see U.S. Pat. No. 3,559,745 to Thompson et al. Thus, it has been necessary in the past to plow a field in strips or in a series of parallel furrows which has left the surface of the soil uneven.

Reversible moldboard plows have been developed to avoid this problem. They permit an operator, who has completed plowing a strip of soil, to turn the plow around, reverse the direction of the moldboards, and continue to plow, turning the soil in the same direction as before. This allows an operator to plow a field from one end of a field to the other end and leaves the soil more even, i.e. leaves the soil surface level.

There are at least two types of reversible plows currently in use. First, there is the two-way or roll-over plow. This type of reversible plow is described in U.S. Pat. No. 4,207,951 to Wilcox et al., which is incorporated hereto by reference. Second, there is the bidirectional moldboard plow. This type of reversible plow and an example of this type of plow, a bidirectional moldboard plow with an adjustable tilting mechanism, are described in U.S. Pat. No. 4,942,928 to Gomez, which is also incorporated herein by reference.

The roll-over type of reversible plow carries two sets of moldboards, and each set is designed to turn the soil in an opposite direction. When an operator has plowed one strip of soil, the plow is turned and the moldboards are rolled over, so that the opposite set of moldboards engages the soil. In this manner, the operator may continue to plow a field and turn the soil in the same direction. This plow, however, possesses at least three disadvantages. First, it's weight is greatly increased by the necessity of carrying a second set of moldboards. Second, it is less stable because of its higher center of gravity. Third, complicated equipment and powerful motors are often required to roll the sets of moldboards over.

The bidirectional moldboard plow avoids these disadvantages. By using a single set of moldboards, there is a reduction in the weight of the plow and a lowering of its center of gravity. Moreover, because the moldboards are bidirectional, they need only be pivoted to cut the soil in either direction, i.e., in opposite directions.

Bottom plowing turns the soil to a relatively deep depth, e.g., in a range of about 1.333 to 1.5 feet (0.406 to 0.457 m). Bottom plows are intended to thoroughly turn the soil and cause uncleared plant material, such as corn stalks, to be buried deep in the soil to decompose and, thereby, to replenish nutrients. This deep plowing also thoroughly aerates the soil, which can be especially important in soils possessing a high clay content.

A bidirectional moldboard plow has a share-like edge at each side of the bidirectional moldboards. Further, a landside is fixed to each side of the trailing face of the moldboard. By reversing the bidirectional moldboard, the plow cuts the soil with an alternative share-like edge and an alternative landside is placed in the furrow. Moreover, if the plow is equipped with an adjustable tilting mechanism, such as that disclosed in U.S. Pat. No. 4,942,928 to Gomez, the angle at which the share-like edge of the moldboard engages the soil can be varied. By varying this angle, the depth of the bottom of the furrow cut by a moldboard from the surface of the soil may also be varied.

Despite these improvements, the ability to plow a field from one end to the other and obtain an even soil surface will depend in part on the soil type. For example, if the soil has significant adhesive qualities, e.g., high clay content, such as is found in many southeastern, southern, and southwestern states in the United States of America; soil that has been turned by a bottom plow may not break up, but instead, may form clumps or clods of soil. Therefore, bottom plowing in such soils will often leave fields uneven and unprepared for planting. Moreover, the uneven soil surface in such fields can hinder the operation of other farm equipment. Further, if large clumps or clods of turned, but unbroken, soil remain in the fields, one of the primary purposes of bottom plowing, namely to bury uncleared plant material, will not be accomplished. It is often necessary, therefore, to break up these clumps or clods of soil in some other manner before the soil can be planted or any further work in preparation for planting can be accomplished.

We recognized the need for an apparatus for use with bottom plows which would break up the clumps or clods of soil and achieve a better leveled soil surface after plowing. Further, it is desirable that this apparatus is suitable for use with reversible bottom plows, such as bidirectional moldboard plows with adjustable tilting mechanisms. An improved bottom plow that is a combination of a reversible bottom plow and a soil breaking apparatus is also recognized as particularly useful.

SUMMARY OF THE INVENTION

We have invented an apparatus, according to the preferred embodiment, that may be attached to a bottom plow for breaking up clumps or clods of soil that has been turned, but not broken up, during plowing. The apparatus is especially useful when plowing soils with adhesive qualities, e.g., with high clay content, which are likely to form such clumps or clods. The soil breaking apparatus is suitable for use with bottom plows including bidirectional moldboard plows with adjustable tilting mechanisms, such as those disclosed in U.S. Pat. No. 4,942,928 to Gomez. We also have invented an improved bottom plow comprising the combination of a reversible bottom plow and a soil breaking apparatus.

The soil breaking apparatus comprises a connection means pivotally attached to a bottom plow; one or more arms attached to and extending from the connection means; an adjustable arm pivoting means for pivoting the one or more arms and the connection means, so that the one or more arms are oriented substantially parallel to the soil; and a plurality of soil breaking members that depend from and are spaced along the one or more arms. The connection means may be a beam that is pivotally attached to the bottom plow at the beam's center.

If the point at which the bottom plow is hitched to a draft animal or farm vehicle is the forward end of the plow, the apparatus is attached to the aft (or opposite) end of the plow. The one or more arms that extend generally to the left of the plow when an observer is facing the forward end of the plow are port arms, and those which extend generally to the right are starboard arms. The apparatus may have at least one port and at least one starboard arm.

The plow may be a reversible bottom plow, such as a bidirectional moldboard plow with an adjustable tilting mechanism. These plows or portions of these plows may be tilted, so that their moldboard or moldboards engage the soil at selectable angles. By varying the angle or angles at which the moldboard or moldboards engage the soil, a plow operator may vary the depth of the furrow or furrows cut by the moldboard or moldboards. Because the varying of this angle or angles can be accomplished by tilting the plow, the apparatus is equipped with adjustable arm pivoting means for pivoting the arms and said connection means, so that the arms are oriented substantially parallel to the soil. The adjustable arm pivoting means may be a hydraulic cylinder, mechanical or a electro-mechanical motor, or the like. A control device separate from that used to control angle or angles of the moldboard or moldboards can be used to pivot the arms, so that they are oriented substantially parallel to the soil. Alternatively, an integrated control device can be used to simultaneously vary the angle or angles of the moldboard or moldboards and to pivot the arms.

The improved bottom plow for turning and breaking up soil comprises a hitching frame and a moldboard frame having a forward and an aft end. The moldboard frame is pivotally attached to the hitching frame. The improved plow further comprises one or more bidirectional moldboards mounted on the moldboard frame. The improved plow also comprises reversing means for pivoting the moldboard frame, so that the one or more moldboards can engage the soil from either direction; a connection means attached to the moldboard frame's aft end; one or more port arms and one or more starboard arms that are fixedly attached to the connection means; and a plurality of soil breaking members that depend from and are spaced along at least one port arm and at least one starboard arm. The reversing means may comprise a hydraulic cylinder or a mechanical or electro-mechanical motor, or the like, and a reversing arm to pivot the moldboard frame.

When the connection means of the improved bottom plow is pivotally attached to the moldboard frame's aft end, the improved plow further comprises adjustable hitch tilting means mounted on the hitching frame for tilting the hitching frame about a generally longitudinal axis. The hitch tilting means may be a hydraulic cylinder or a mechanical or electro-mechanical motor, or the like, and is used to vary the angle or angles at which the one or more bidirectional moldboards engage the soil. The improved bottom plow also may comprise means for simultaneously engaging the reversing means and the hitch tilting means, and adjustable arm pivoting means for pivoting the one or more port arms and the one or more starboard arms and the connection means, so that the one or more port and one or more starboard arms are oriented substantially parallel to the soil despite the tilting of the hitching frame.

Additionally, the improved bottom plow may comprise a combination of a bidirectional moldboard plow with an adjustable tilting mechanism and the soil breaking apparatus. The soil breaking apparatus portion of the improved plow may further comprise a connection means pivotally attached to said moldboard plow's aft end; one or more port arms and one or more starboard arms fixedly attached to the connection means; adjustable arm pivoting means for pivoting the one or more port and one or more starboard arms and the connection means, so that the one or more port and one or more starboard arms are oriented substantially parallel to the soil; and a plurality of soil breaking members depending from and spaced along at least one port and at least one starboard arm.

The connection means of the apparatus and those of the improved bottom plow may be a beam that is pivotally attached at its center to the aft end of the moldboard plow's moldboard frame such that it is substantially perpendicular to the plows longitudinal axis. Moreover, the arms of the apparatus and those of the improved plow may be reinforced by one or more struts which extend between each arm and the connection means. A plurality of soil breaking members depend from and are spaced along the one or more arms. They may also depend from and be spaced along the connection means and the one or more struts. These soil breaking members may be rods, bars, blades, or the like. Regardless of the form these members take and on which components, e.g., the arms, struts, and connection means, of the apparatus or the improved plow they are placed, they should be adequately spaced, and extend sufficiently below those components, such that no clumps or clods of soil can pass under the arms or connection means or struts without being struck and broken by one or more of these members. Moreover, the soil breaking members may depend vertically from these components or at angles less than vertical.

Although the apparatus and the improved plow may be made out of metal, such as steel, or a suitable combination of metal and plastic, the apparatus and the plow may be subjected to considerable forces and stresses caused by the turned, but unbroken, soil striking the soil breaking members or the components of the apparatus or those of the improved plow. These forces and stresses may be especially severe at the point of attachment at which the connection means is pivotally attached to the plow. Chains may be used to link the arms or struts, or both, to connection points on the bottom plow. These chains may relieve some of the forces and stresses from the point of attachment and distribute them throughout the apparatus and the plow or the improved plow.

The apparatus and the improved plow may also comprise a wheel or wheels and means for raising and lowering this wheel or these wheels. When the wheel or wheels is(are) lowered, the plow and the apparatus are raised and they can be transported without contacting the soil. When the wheel or wheels is(are) raised, however, the moldboard or moldboards can engage the soil, and the apparatus will be positioned to break up soil turned by the plow. Suitable means for raising and lowering the wheel or wheels may be a hydraulic cylinder, mechanical electro-mechanical motor, or the like. These means may be controlled by a separate control device from that controlling the plow's adjustable tilting mechanism, the reversing means, or the adjustable arm pivoting means.

It is an object of this apparatus to break up clumps or clods of soil that have been turned, but not broken up, by a bottom plow. It is a feature of this apparatus that it can attach to a bottom plow. It is an advantage of this apparatus that the clumps or clods of soil can be broken up and the soil leveled during the plowing of the soil.

It is another object of this apparatus that it can be pivoted, so that its arms are oriented substantially parallel to the soil although the bottom plow may be tilted to vary the depth of the furrows cut by the plow's moldboards. It is a feature of this apparatus that it may be used with bidirectional moldboard plows with adjustable tilting mechanisms. It is an advantage of this apparatus that despite the depth of the furrow plowed, the soil turned will be broken up to provide a better leveled soil surface.

It is an object of the improved bottom plow combining a reversible bottom plow with a soil breaking apparatus that clumps or clods of soil turned by the bottom plows are broken up and the soil is better leveled after plowing. It is a feature of this combination that a single pass over a field is necessary to turn and break up the soil. It is an advantage of this combination that despite the adhesive qualities of the soil that a field may be plowed from end to end and a substantially level soil surface obtained.

Other objects, features, and advantages will be apparent when the detailed description of the invention and the drawings are considered.

BRIEF DESCRIPTION OF THE DRAWINGS

FIG. 3 is a side view of the apparatus pivotally attached to a bidirectional moldboard plow with an adjustable tilting mechanism, which is illustrated in FIG. 2a.

DETAILED DESCRIPTION OF THE INVENTION

Figure 1:
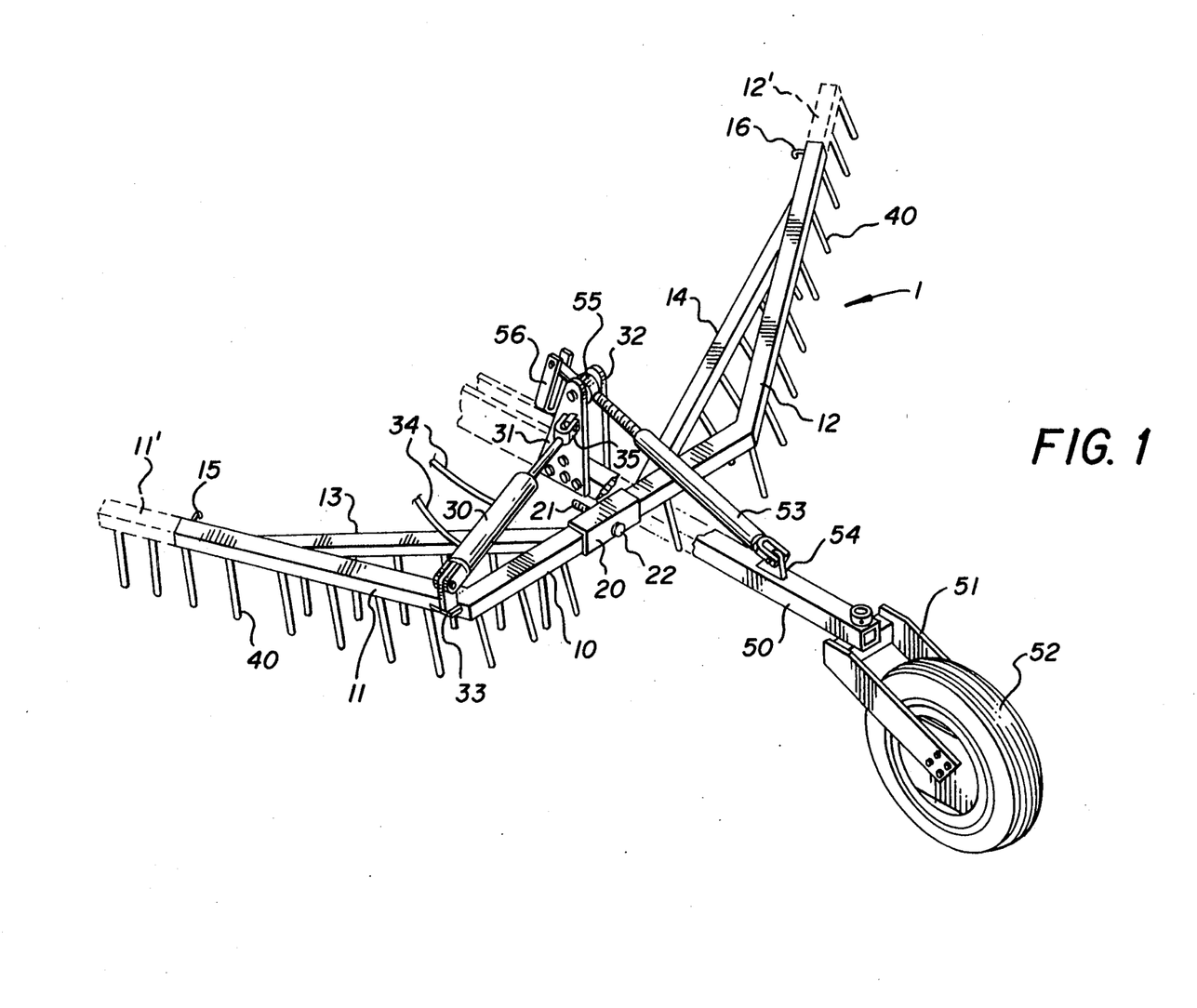
FIG. 1 is a perspective view of the apparatus in which is shown greater detail of the soil breaking members and of a wheel and means for raising and lowering the wheel.

Referring to FIG. 1, a preferred embodiment of the soil breaking apparatus, generally indicated as 1, comprises a beam 10, a port arm 11 and a strut 13, a starboard arm 12 and a strut 14, and soil breaking members 40 depending from beam 10 and arms 11 and 12. Preferably, beam 10 and arms 11 and 12 may be manufactured from 2 inch by 3 inch by 0.188 inch (5.08 cm by 7.62 cm by 0.476 cm) rectangular steel tubing, and struts 13 and 14 may be manufactured from 2 inch by 2 inch by 0.188 inch (5.08 cm by 5.08 cm by 0.476 cm) square steel tubing. The length of beam 10 and arms 11 and 12 will depend on the number and spacing of the moldboards (not shown) mounted on the plow. Arms 11 and 12 preferably comprise hinged arm extensions 11' and 12' respectively. These extensions are part of arms, but can be folded when the soil breaking apparatus is being transported and locked in place by means of locking pins (not shown) when in use.

It is further preferred that soil breaking members 40 depend from struts 13 and 14, as well as from beam 10 and arms 11 and 12. It is also preferred that soil breaking members 40 may be rods manufactured from steel bar stock with a diameter of about 1.125 inch (2.858 cm). It is additionally preferred that soil breaking members 40 are spaced such that there may be about 6 inches (15.24 cm) between their centers and that they have a length of about 12 inches (30.48 cm). Further, it is preferred that soil breaking members 40 are angled away from the plow at an angle of about 20° to 30° from the vertical.

The bottom plow's frame has been cut away to reveal the means for the pivotal attachment of beam 10 to the bottom plow. Beam 10 is reinforced by a beam reinforcement 20 at the point of attachment (not shown). A pivot bolt 21 is attached to the plow at the point of attachment and extends through beam 10 and reinforcement 20 and is capped at the end of pivot bolt 21 opposite the point of attachment (not shown). Preferably, pivot bolt 21 is made from steel bar stock and may be about 6 inches (15.24 cm) in length and has a diameter of about 1.938 inches (4.921 cm). It is fixedly attached at the point of attachment (not shown) to the plow. Reinforcement 20 surrounds beam 10 and may be about 0.5 inches (1.27 cm) thick. A 4 inch (10.16 cm) long bushing (not shown) passes through beam 10 and reinforcement 20. The bushing has an exterior diameter of about 2.5 inches (6.35 cm) and an interior diameter of about 2 inches (5.08 cm). Pivot bolt 21 passes through the bushing and is capped by a cap 22 to pivotally attach beam 10 to the plow. Cap 22 has an interior depth of about 1.5 inches (3.18 cm) and an interior diameter slightly of less than 2 inches (5.08 cm), so that cap 22 will fit snugly over pivot bolt 21. Cap 22 is also preferably fitted with a bolt (not shown) having a diameter of about 0.5 inch (1.27 cm) which passes through cap 22 and engages pivot bolt 21.

Apparatus 1 further comprises adjustable arm pivoting means 30, so that arms 11 and 12, struts 13 and 14, and beam 10 are maintained substantially parallel to the soil (not shown) despite the tilting of the plow. Arm pivoting means 30 is preferably a two-way hydraulic cylinder and is controlled from a separate arm pivoting means control (not shown) by means of control lines 34. A port support 31 and a starboard support 32 are fixedly attached to the plow. Arm pivoting means 30 is preferably mounted on port arm mounting point 33 and port support mounting point 35 which is affixed to port support 31.

Preferably, a wheel strut 50 is pivotally attached to the plow, and a wheel housing 51 holding a wheel 52 is pivotally attached to wheel strut 50. Means 53 for raising and lowering wheel 52 are attached to wheel strut 50 at strut mounting point 54 and between port and starboard supports 31 and 32 by means of support mounting point 55. It is further preferred that means 53 are mechanical, such as a screw-type jack, and that means 53 are operated by rotating crank handle 56 to raise and lower wheel 52.

Figure 2A:
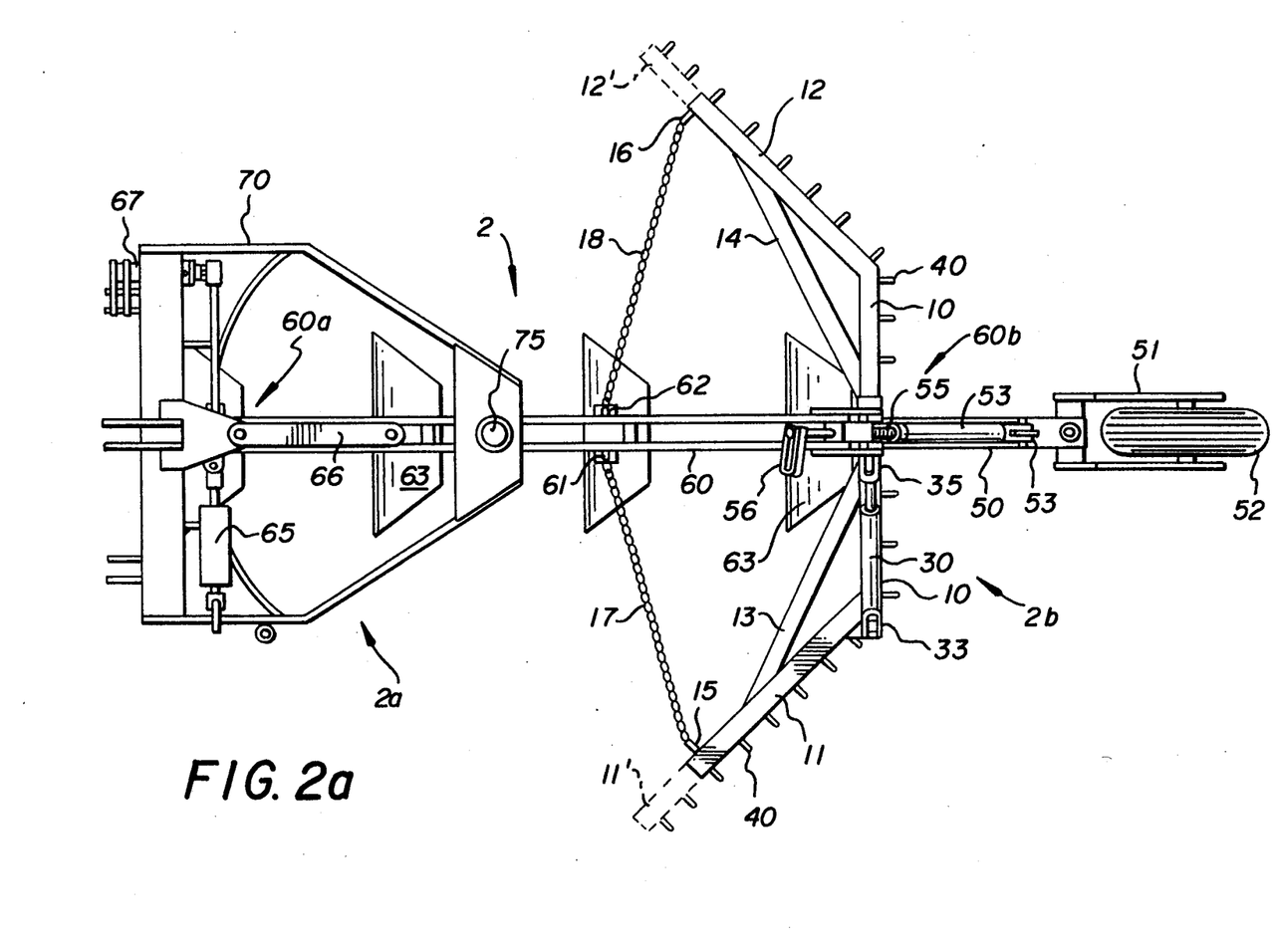
FIG. 2a is a plan view of an improved bottom plow wherein the apparatus is pivotally attached to a bidirectional moldboard plow with adjustable tilting mechanism.

Apparatus 1 may be subjected to significant stresses and forces caused by clumps or clods of soil striking soil breaking members 40. Much of this force and stress may be transferred to pivot bolt 21, and if pivot bolt 21 is subjected to sufficient force and stresses, it may shear. Therefore, it is preferred that port and starboard chain attachment points 15 and 16 are located on arms 11 and 12, respectively. It is further preferred that attachment points 15 and 16 are located on the outboard ends, but not on hinged arm extensions 11' or 12', of arms 11 and 12. Chains 17 and 18 are used to link attachment points 15 and 16 to connection points 61 and 62 on the plow as shown in FIG. 2a. Preferably, the chains will have a link diameter of at least about 0.25 inches (0.635 cm). Moreover, the chains must be attached such that they do not interfere with pivoting of arms 11, and 12, struts 13 and 14, and beam 10, or other movements of the plow. This may be accomplished, for example, by loosening or detaching the chains from the plow when pivoting arms 11 and 12, struts 13 and 14, and beam 10 and tightening or reattaching the chains after the movement is complete.

Referring to FIG. 2a, a preferred embodiment of an improved bottom plow, generally indicated as 2, comprises a reversible bottom plowing portion, generally indicated as 2a, and a soil breaking portion, generally indicated as 2b. Soil breaking portion 2b of improved plow bottom 2 is preferably as described above in FIG. 1. The length of beam 10 and arms 11 and 12 depends in part on the length of moldboard frame 60 and the spacing of the moldboards 63 see also FIG. 2c. When moldboard frame 60 is about 7.167 feet (2.184 m) in length and four (4) moldboards 63 are spaced about 1.333 feet (0.406 m) apart, it is preferred that beam 10 is about 4 feet (1.219 m) in length and arms 11 and 12 are about 8 feet (2.438 m) in length. If the arms 11 and 12 are hinged, each hinged portion 11' and 12' will have a length of about 1.833 feet (0.559 m). It is further preferred, however, that beam 10 is pivotally attached to moldboard frame's aft end 60b. such that beam 10 is substantially perpendicular to moldboard frame 60. Preferably, the reversible bottom plow is a bidirectional moldboard plow with an adjustable tilting mechanism, such as that disclosed in U.S. Pat. No. 4,942,928 to Gomez. The improved bottom plow specifically comprises a hitching frame 70; a moldboard frame 60 having a forward end 60a and an aft end 60b; and four (4) bidirectional moldboards 63 mounted on and rotationally rigid with respect to moldboard frame 60.

Moldboard frame 60 is pivotally attached to hitching frame 70 by pivot connection 75. Moldboard frame 60 is pivoted on pivot connection 75 by reversing means comprising reversing drive 65 and reversing arm 66. Reversing drive 65 can be a hydraulic cylinder or a mechanical or a electro-mechanical motor. Improved bottom plow 2, however, preferably also comprises adjustable hitch tilting means 67, which varies the angle at which moldboards 63 engage the soil, and means 17 and 18 for simultaneously engaging reversing means and tilting means 67.

When the improved bottom plow comprises a bidirectional moldboard plow, it is further preferred that connection points 61 and 62 are located on moldboard frame 60. This allows moldboard frame 60 to be pivoted without interfering with the chains (not shown).

Figure 3:
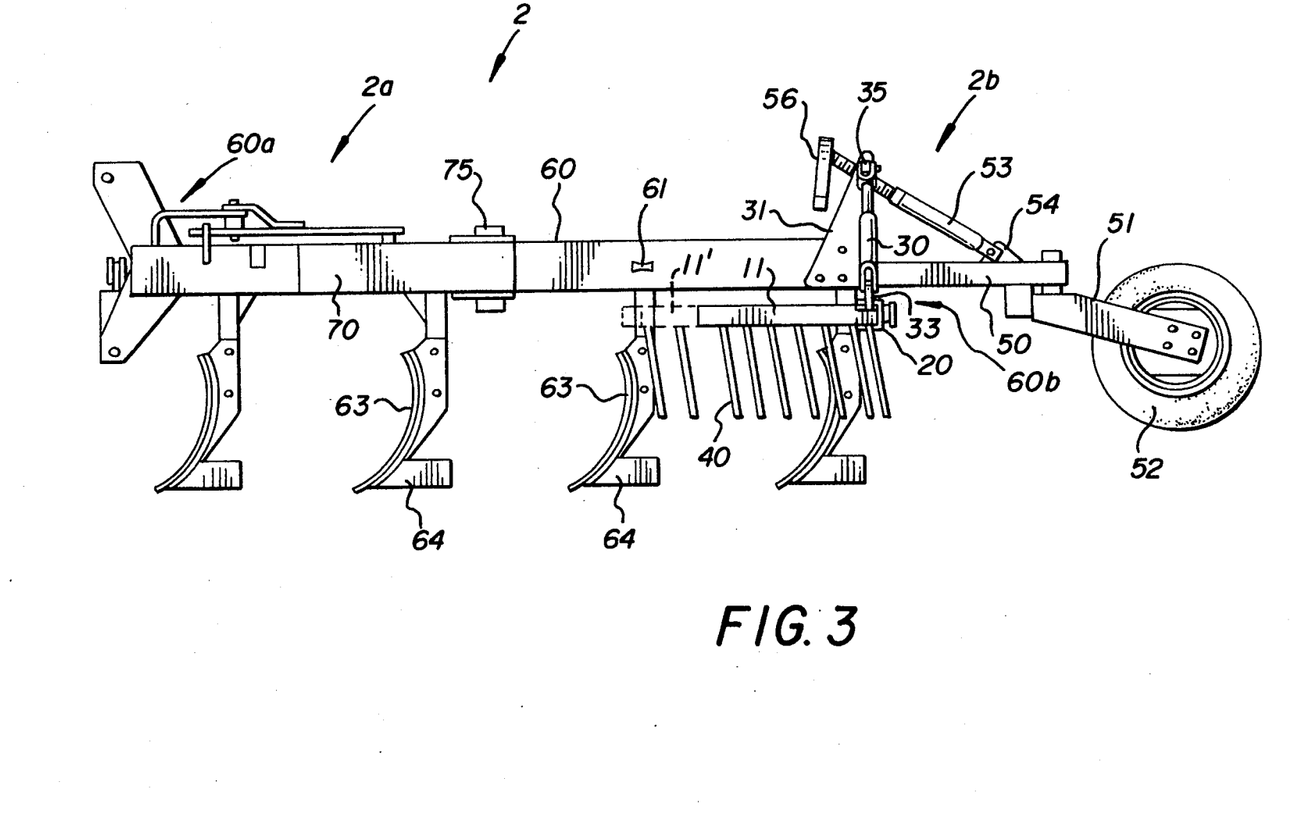

Referring to FIG. 3, a side view of improved plow 2a (without chains 17 and 18) as depicted in FIG. 2 is shown. Preferably, landsides 64 are attached to the trailing face of moldboards 63. This figure also only depicts that soil breaking members 40 depending from port arm 11. It is preferred, however, that soil breaking members 40 depend from and are spaced along arms 11 and 12, struts 13 and 14, and beam 10. In addition, it is preferred that when reversible bottom plowing portion 2a of improved bottom plow 2 is a bidirectional moldboard plow with an attached tilting mechanism, at least sixteen (16) soil breaking members 40 depend from and are spaced along the apparatus components that are located on either side of the generally longitudinal axis (not shown) of improved bottom plow 2. Therefore, it is preferred that a total of at least thirty-two (32) soil breaking members 40 depend from and are spaced along arms 11 and 12, struts 13 and 14, and beam 10.

Figure 2B:
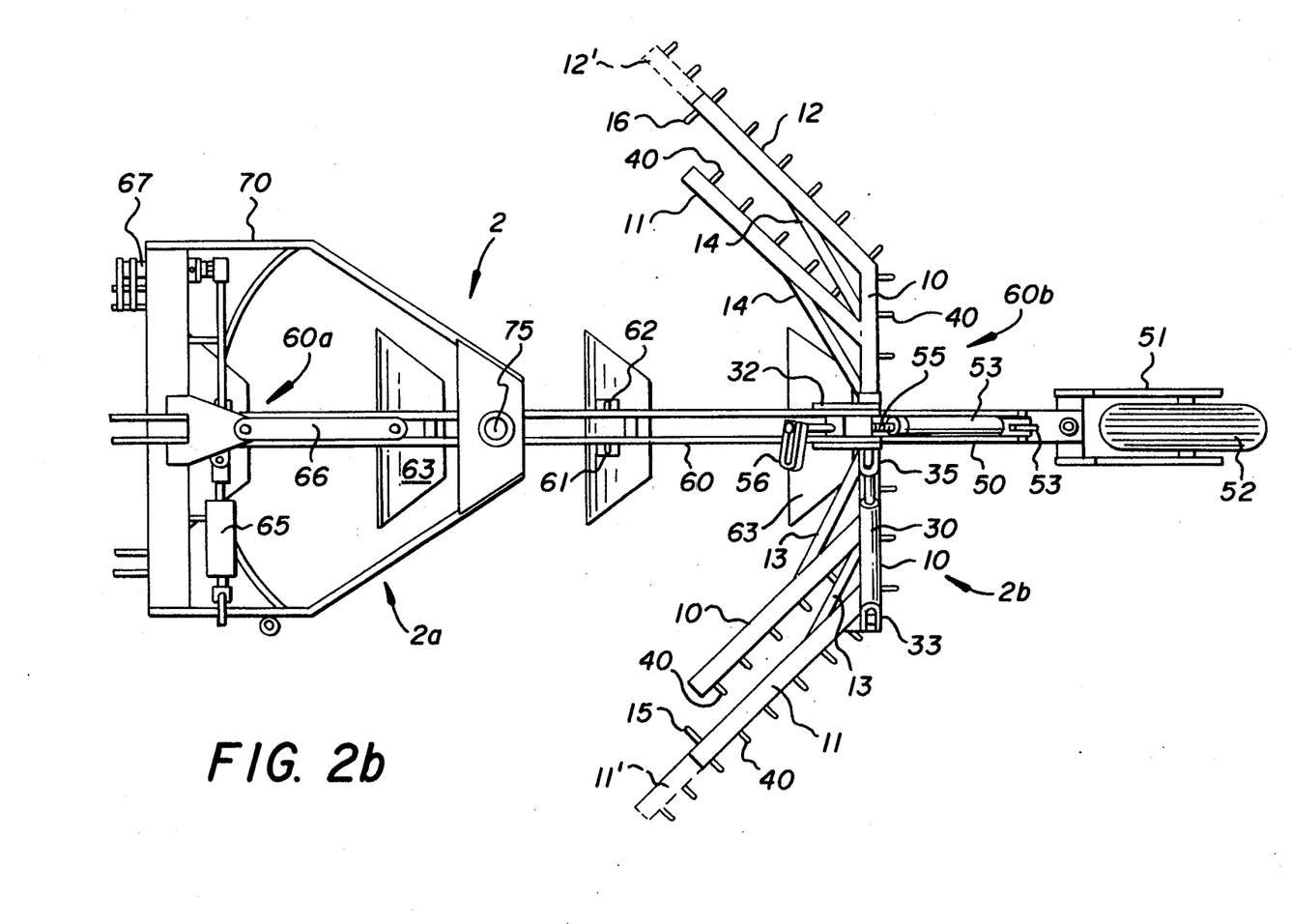
FIG. 2b is a plan view of an improved bottom plow wherein the apparatus pivotally attached to a bidirectional moldboard plow has more than one port and more than one starboard arms.
Figure 4:
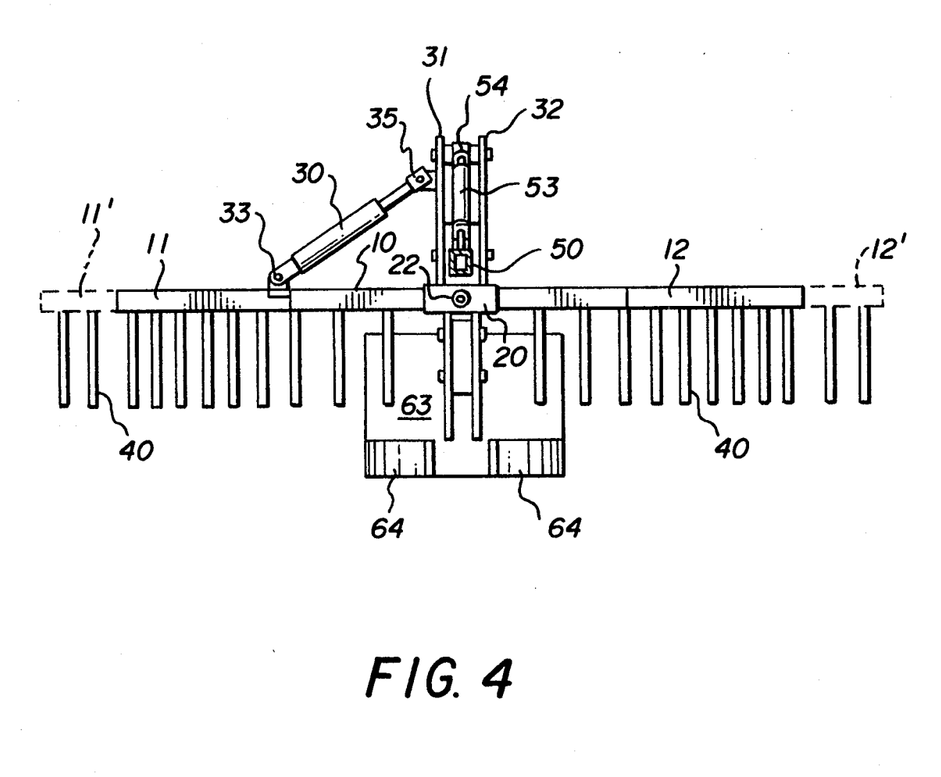
FIG. 4 is an end view of the apparatus pivotally attached to a bidirectional moldboard plow with an adjustable tilting mechanism, which is illustrated in FIG. 2a, in which is shown greater detail of the adjustable arm pivoting means and the attachment point.

FIG. 4 depicts soil breaking portion 2b of improved bottom plow 2 from the rear. Wheel strut 50 has been cut away and wheel housing 51 and wheel 52, depicted in FIGS. 2a–2b and 3, have been removed to more clearly shown beam 10 pivotally attached to moldboard frame's aft end 60b. Further, the preferred placement of landsides 64 at either edge of the trailing face of moldboard 63 is also depicted in FIG. 4.

The dimensions of the apparatus and the improved bottom plow may be varied to accommodate various plows and various plowing tasks. Although a detailed description of the present invention has been provided above, it is to be understood that the scope of the invention is not so be limited thereby, but is to be determined by the claims which follow.

We claim:

1. A soil breaking apparatus suitable for use with bottom plows comprising:
   connection means pivotally attached to said bottom plow;
   one or more arms attached to and extending from said connection means;
   adjustable arm pivoting means for pivoting said one or more arms and said connection means, so that said one or more arms are oriented substantially parallel to said soil; and
   a plurality of soil breaking members depending from and spaced along said one or more arms.

2. The soil breaking apparatus of claim 1 wherein said connection means is a beam pivotally attached at said beam's center to said bottom plow.

3. The soil breaking apparatus of claim 2 wherein a plurality of soil breaking members depend from and are spaced along said beam.

4. The soil breaking apparatus of claim 3 wherein a port and a starboard arm are fixedly attached to said connection means.

5. The soil breaking apparatus of claim 4 further comprising one or more struts extending between said port arm and said connection means and between said starboard arm and said connection means.

6. The soil breaking apparatus of claim 5 wherein a plurality of soil breaking members depend from and are spaced along said one or more struts.

7. The soil breaking apparatus of claim 1 wherein a port and a starboard arm are fixedly attached to said connection means.

8. The bottom plow of claim 7 further comprising one or more struts extending between said port arms and said connection means and between said starboard arms and said connection means.

9. The soil breaking apparatus of claim 8 wherein a plurality of soil breaking members depend from and are spaced along said one or more struts.

10. The soil breaking apparatus of claim 7 further comprising chains linking connection points on said bottom plow to said port and said starboard arms.

11. The soil breaking apparatus of claim 1 further comprising a wheel and means for lowering said wheel to raise and transport said plow and for raising said wheel to lower said plow.

12. A soil breaking apparatus for use with a bidirectional moldboard plow with an adjustable tilting mechanism comprising:
    a beam having a port and a starboard end and a center pivotally attached to said plow at said center;
    a port arm attached to said beam's port end and a starboard arm attached to said beams starboard end;
    a first strut extending between said starboard arm and said beam and a second strut extending between said port arm and said beam;
    a plurality of soil breaking rods depending from and spaced along said arms, said struts, and said beam; and
    adjustable arm pivoting means for pivoting said arms and said beam, so that said arms and said beam are oriented substantially parallel to said soil.

13. The soil breaking apparatus of claim 12 further comprising chains linking connection points on said plow with said port and said starboard arms.

14. The soil breaking apparatus of claim 13 further comprising a wheel and means for lowering said wheel to raise and transport said plow and for raising said wheel to lower said plow.

15. An improved bottom plow for turning and breaking up soil comprising:
    a hitching frame;
    a moldboard frame having a forward and an aft end, said moldboard frame being pivotally attached to said hitching frame;
    one or more bidirectional moldboards mounted on said moldboard frame;
    a connection means attached to said moldboard frame's aft end;
    one or more port arms and one or more starboard arms fixedly attached to said connection means;
    reversing means for pivoting said moldboard frame, so that said moldboards can engage said soil from either direction;
    adjustable hitch tilting means mounted on said hitching frame for tilting said hitching frame about a generally longitudinal axis;
    means for simultaneously engaging said reversing and said hitch tilting means;
    adjustable arm pivoting means for pivoting said one or more port and said one or more starboard arms and said connection means, so that said port and said starboard arms are oriented substantially parallel to said soil despite tilting of said hitching frame; and
    a plurality of soil breaking members depending from and spaced along said one or more port arms and said one or more starboard arms.

16. The improved bottom plow of claim 15 wherein said connection means is a beam pivotally attached at said beam's center to said moldboard frame's aft end such that said beam is substantially perpendicular to said moldboard frame.

17. The soil breaking apparatus of claim 16 wherein a plurality of soil breaking members depend from and are spaced along said beam.

18. The improved bottom plow of claim 17 further comprising one or more struts extending between each of said one or more port and said one or more starboard arms and said connection means.

19. The improved bottom plow of claim 18 wherein a plurality of soil breaking members depend from and are spaced along said struts.

20. The improved bottom plow of claim 15 further comprising one or more struts extending between each of said one or more port and said one or more starboard arms and said connection means.

21. The improved bottom plow of claim 20 wherein a plurality of soil breaking members depend from and are spaced along said struts.

22. The soil breaking apparatus of claim 15 further comprising a wheel and means for lowering said wheel to raise and transport said plow and for raising said wheel to lower said plow.

23. The improved bottom plow of claim 15 further comprising chains linking connection points on said hitching frame to said one or more port and said one or more starboard arms.

24. An improved bottom plow for turning and breaking up soil comprising:
    a bidirectional moldboard plow with an adjustable tilting mechanism;
    a connection means pivotally attached to said moldboard plow;

a port arm and a starboard arm fixedly attached to said connection means;

adjustable arm pivoting means for pivoting said port and said starboard arms, so that said port and said starboard arm are oriented substantially parallel to said soil; and a plurality of soil breaking members depending from and spaced along said port arm and said starboard arms.

25. The improved bottom plow of claim 24 wherein said connection means is a beam pivotally attached at said beam's center to said moldboard plow's longitudinal axis such that said beam is substantially perpendicular to said moldboard frame.

26. The bottom plow of claim 25 wherein a plurality of soil breaking members depend from and are spaced along said beam.

27. The bottom plow of claim 26 further comprising one or more struts extending between said port arms and said connection means and between said starboard arms and said connection means.

28. The bottom plow of claim 27 wherein a plurality of soil breaking members depend from and are spaced along said struts.

29. The bottom plow of claim 24 further comprising one or more struts extending between said port arms and said connection means and between said starboard arms and said connection means.

30. The bottom plow of claim 29 wherein a plurality of soil breaking members depend from and are spaced along said struts.

31. The bottom plow of claim 24 further comprising chains linking connection points on said hitching frame to said port and said starboard arms.

32. The soil breaking apparatus of claim 24 further comprising a wheel and means for lowering said wheel to raise and transport said plow and for raising said wheel to lower said plow.

* * * * *